United States Patent
Okazaki

(10) Patent No.: US 9,710,077 B2
(45) Date of Patent: Jul. 18, 2017

(54) OPERATION UNIT

(71) Applicant: OMRON Corporation, Kyoto-shi, Kyoto (JP)

(72) Inventor: Ryoji Okazaki, Aichi (JP)

(73) Assignee: OMRON Corporation, Kyoto (JP)

( * ) Notice: Subject to any disclaimer, the term of this patent is extended or adjusted under 35 U.S.C. 154(b) by 4 days.

(21) Appl. No.: 14/435,504

(22) PCT Filed: Sep. 10, 2013

(86) PCT No.: PCT/JP2013/005351
§ 371 (c)(1),
(2) Date: Apr. 14, 2015

(87) PCT Pub. No.: WO2014/080548
PCT Pub. Date: May 30, 2014

(65) Prior Publication Data
US 2015/0277584 A1    Oct. 1, 2015

(30) Foreign Application Priority Data
Nov. 22, 2012  (JP) ................. 2012-256805

(51) Int. Cl.
*G06F 3/0362* (2013.01)
*G06F 3/0354* (2013.01)
*G07F 17/32* (2006.01)

(52) U.S. Cl.
CPC .......... *G06F 3/0362* (2013.01); *G06F 3/0354* (2013.01); *G07F 17/3204* (2013.01); *G07F 17/3209* (2013.01)

(58) Field of Classification Search
None
See application file for complete search history.

(56) References Cited

U.S. PATENT DOCUMENTS

2010/0140059 A1\*  6/2010  Kagami ............ H01H 11/0006
200/14

FOREIGN PATENT DOCUMENTS

| JP | H9-6532 A | 1/1997 |
|----|-----------|--------|
| JP | 2003-131809 A | 5/2003 |
| JP | 2005-000548 A | 1/2005 |
| JP | 2005-115783 A5 | 4/2005 |
| JP | 2005-137430 A | 6/2005 |
| JP | 2006-269367 A | 10/2006 |
| JP | 2007-209422 A | 8/2007 |
| JP | 2008-054696 A | 3/2008 |
| JP | 2009-112436 A | 5/2009 |
| JP | 2010-035121 A | 2/2010 |

(Continued)

OTHER PUBLICATIONS

International Search Report issued in PCT/JP2013/005351 mailed on Nov. 19, 2013 (4 pages).

(Continued)

*Primary Examiner* — Kenneth B Lee, Jr.
(74) *Attorney, Agent, or Firm* — Osha Liang LLP

(57) ABSTRACT

An operation unit has a rotary body that has a through-hole, and that rotates about a rotation axis that passes through the through-hole, a ball that is disposed inside the through-hole, a rotary body-detecting part that detects rotation of the rotary body, a first ball-detecting part that detects rotation of the ball, and a second ball-detecting part that detects pressing of the ball.

20 Claims, 8 Drawing Sheets

(56) References Cited

FOREIGN PATENT DOCUMENTS

| JP | 2011-092378 A | 5/2011 |
|---|---|---|
| JP | 2011-209898 A | 10/2011 |
| WO | 03/065194 A1 | 8/2003 |

OTHER PUBLICATIONS

Notification of Reasons for Refusal issued in corresponding Japanese Application No. 2012-256805, mailed on Aug. 30, 2016 (7 pages).
Notification of Reasons for Refusal issued in corresponding Japanese Application No. 2012-256805, mailed on Mar. 4, 2017 (7 pages)

\* cited by examiner

OPERATION UNIT

CROSS-REFERENCE TO RELATED APPLICATIONS

The present application is a national stage application of PCT/JP/2013/005351, which claims priority to Japanese Patent Application No. 2012-256805, filed on Nov. 22, 2012, the contents of which are herein incorporated by reference in its entirety.

BACKGROUND

1. Technical Field

The present invention relates to an operation unit.

2. Related Art

Patent Literature 1 discloses a liquid crystal operation button for changing, according to a software program, characters, patterns, the number of bets or the number of lines that are to be displayed on a liquid crystal display apparatus and required for game operations. Because such a liquid crystal operation button makes it possible to change operation contents to be allocated to the liquid crystal button, the number of liquid crystal buttons can be reduced, and the installation space of the liquid crystal button can be reduced.

[Patent Literature 1] Japanese Patent Application Publication No. 2008-54696

SUMMARY

However, it is desired to further reduce the installation space of an operation unit such as a button provided to a slot machine.

An operation unit according to one or more embodiments of the present invention comprises: a rotary body that has a through-hole and rotates about a rotation axis that passes through the through-hole; a ball that is placed inside the through-hole; a rotary body-detecting part that detects rotation of the rotary body; a first ball-detecting part that detects rotation of the ball; and a second ball-detecting part that detects pressing of the ball.

The operation unit may further comprise a rotary body-light-emitting part that emits light responding to rotation of the rotary body being detected by the rotary body-detecting part.

In the operation unit, the rotary body-detecting part may detect at least one of the amount of rotation, rotation speed, and direction of rotation of the rotary body, and the operation unit may further comprise a rotary body-light-emission control part that controls a light-emission pattern of the rotary body-light-emitting part based on the amount of rotation, rotation speed, or direction of rotation of the rotary body detected by the rotary body-detecting part.

In the operation unit, the rotary body-light-emitting part may have at least one rotary body-light-emitting element, and the at least one rotary body-light-emitting element may be provided below a peripheral area of the through-hole of the rotary body, and output light from a periphery of the rotary body.

The operation unit may further comprise a first ball-light-emitting part that emits light responding to rotation of the ball being detected by the first ball-detecting part.

In the operation unit, the first ball-detecting part may detect at least one of the amount of rotation, rotation speed, and direction of rotation of the ball, and the operation unit may further comprise a first ball-light-emission control part that controls a light-emission pattern of the first ball-light-emitting part based on the amount of rotation, rotation speed, or direction of rotation of the ball detected by the first ball-detecting part.

In the operation unit, the first ball-light-emitting part may have at least one first ball-light-emitting element, and the at least one first ball-light-emitting element may be provided below a peripheral area of the through-hole of the rotary body, and output light through the rotary body.

In the operation unit, the first ball-light-emitting part may have a plurality of first ball-light-emitting elements, the plurality of first ball-light-emitting elements may be provided below different positions of a peripheral area of the through-hole of the rotary body, and output light from the rotary body, and the first ball-light-emission control part may allow a first ball-light-emitting element, among the plurality of first ball-light-emitting elements, that is associated with the direction of rotation of the ball detected by the first ball-detecting part to emit light.

The operation unit may further comprise a second ball-light-emitting part that emits light responding to pressing of the ball being detected by the second ball-detecting part.

In the operation unit, the second ball-light-emitting part may have at least one second ball-light-emitting element, the ball may transmit light, and the at least one second ball-light-emitting element may be positioned below the ball, and output light through the ball.

The operation unit may further comprise: an outer cylinder that is hollow and cylindrical, and has an axial part therein; an inner cylinder that is hollow and cylindrical, and is provided inside the outer cylinder such that the inner cylinder is rotatable about a central axis of the axial part; and a ball support that is provided inside the inner cylinder such that the ball support is movable up and down along the central axis direction, and supports the ball.

In the operation unit, the ball support may include a hollow cylindrical part, and support the ball at an open end of the cylindrical part.

The embodiments of the present invention described above are not limiting. The scope of the present invention may also include a sub-combination of the features described above.

DETAILED DESCRIPTION

Hereinafter, embodiments of the present invention will be described. The embodiments do not limit the invention, and all the combinations of the features described in the embodiments are not limiting. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
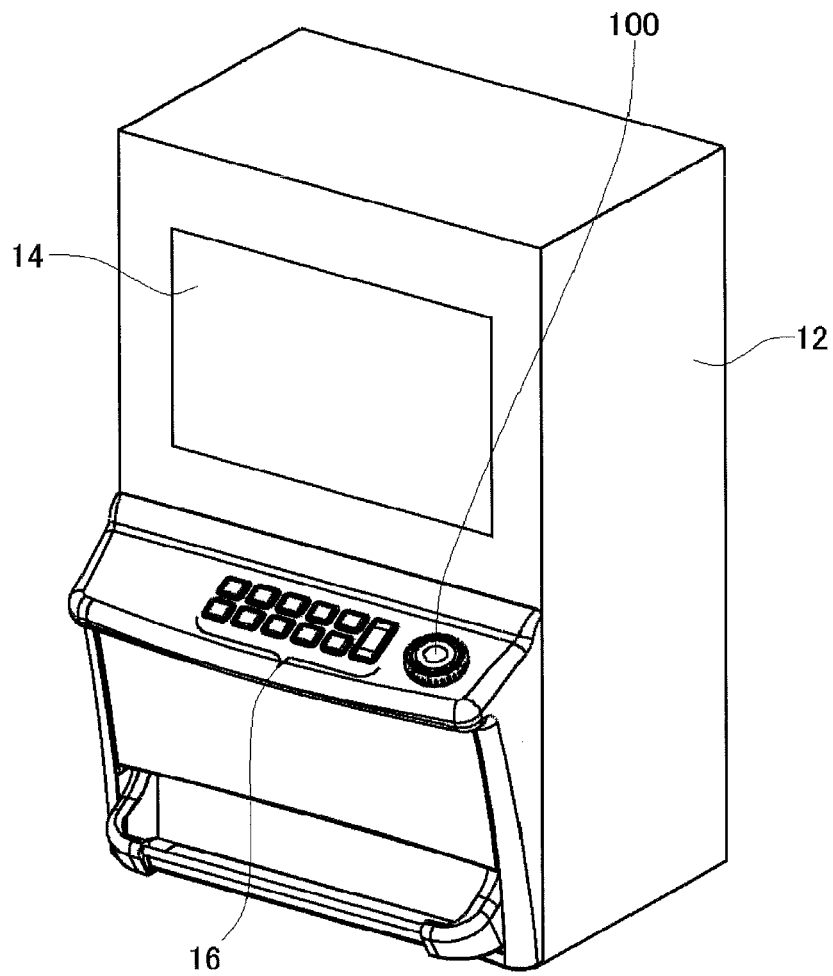
FIG. 1 is an external perspective view of a slot machine according to one or more embodiments of the present invention.

FIG. 1 is one example of an external perspective view of a slot machine 10 according to one or more embodiments of the present invention. The slot machine 10 comprises a main body 12, a display part 14, a setting button set 16, and an operation unit 100. The slot machine 10 is one example of game machines. Note that the operation unit 100 may be mounted on other game machines such as Japanese pinballs, Japanese slot machines, and game consoles.

The display part 14 may display game images including a plurality of reels indicating multiple types of patterns, winning lines that define combinations of patterns, and the number of bets that indicate a money amount betted on winning lines. Other than primary games of game machines, the display part 14 may display images about a so-called mini game that is started under predetermined conditions during the games. The setting button set 16 receives, from a player, an instruction to set the number of lines of winning lines, and the number of bets on the winning lines. The operation unit 100 receives, from a user, an instruction about rotation of a reel, a plurality of items, for example an instruction about selection of a mini game to be performed from among a plurality of mini games, and an instruction about operation in the mini game.

Figure 2:
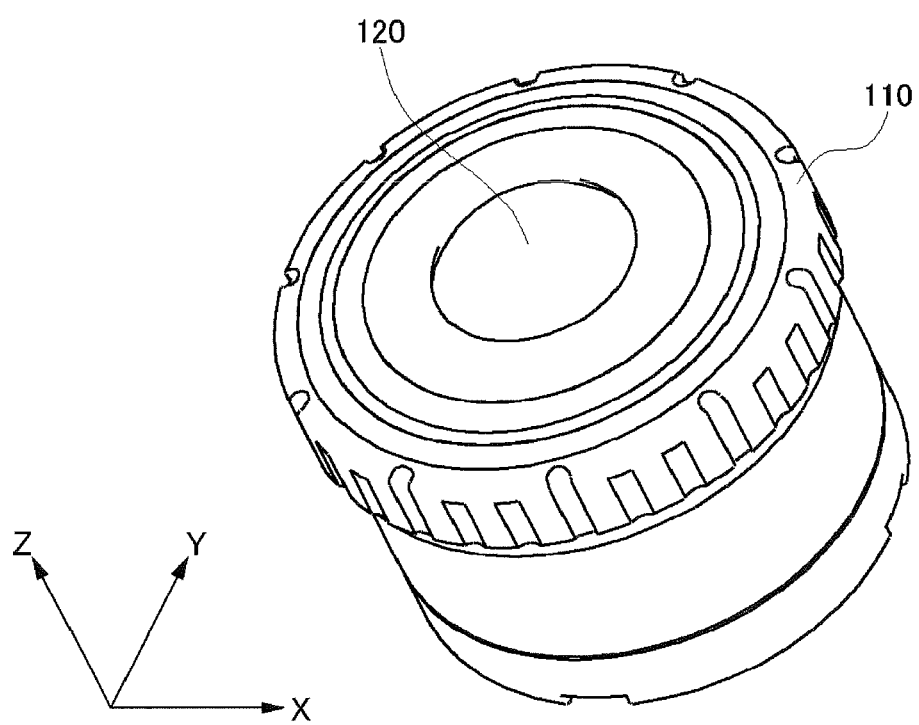
FIG. 2 is an external perspective view of an operation unit.

FIG. 2 illustrates an external perspective view of the operation unit 100. The operation unit comprises a rotary body 110 and a ball 120. The rotary body 110 has a through-hole, and rotates about a rotation axis that passes through the through-hole. The ball 120 is placed inside the through-hole. The rotary body 110 receives, from a player, an instruction to rotate a reel. When the player rotates the rotary body 110, rotation of the reel is started. The rotary body 110 is, at at least its portion around the ball 120, configured with a transparent or semi-transparent material, and transmits light that is radiated from a light-emitting part provided inside the operation unit 100. A portion around the through-hole of the rotary body 110 is illuminated with light that is radiated from the light-emitting part, and the illuminated portion varies depending on the direction of rotation of the ball 120. Also, a periphery of the rotary body 110 is illuminated with light that is radiated from another light-emitting part provided inside the operation unit 100. Responding to the rotary body 110 being rotated about the rotation axis that passes through the through-hole, the periphery of the rotary body 110 is illuminated with light that is radiated from the other light-emitting part.

The ball 120 functions as a so-called trackball, and for example receives, from a player, an instruction to move a pointer displayed on the display part 14 in a direction according to the direction of rotation of the ball 120. The ball 120 may receive, from a player, an instruction to switch items to be presented on the display part 14 as selection target items from among a plurality of items. Also, the ball 120 functions as a push-button switch. When being pressed in the rotation axis direction, the ball 120 may receive, from a player, an instruction to determine, as a selected item, a selection target item displayed on the display part 14. The ball 120 is configured with a transparent or semi-transparent material, and transmits light that is radiated from a light-emitting part provided inside the operation unit 100. The ball 120 is illuminated with light that is radiated from the light-emitting part responding to pressing of the ball 120.

In this manner, it is possible to reduce the installation space of an operation button and the like by placing the ball 120 that functions as a trackball and a push-button switch inside the rotary body 110 that receives an instruction to rotate a reel, and the like. Also, the rotary body 110, the periphery of the rotary body 110, or the ball 120 is illuminated with light responding to rotation of the rotary body 110, or rotation or pressing of the ball 120. Accordingly, decorativeness of the operation unit 100 can be improved.

Figure 3:
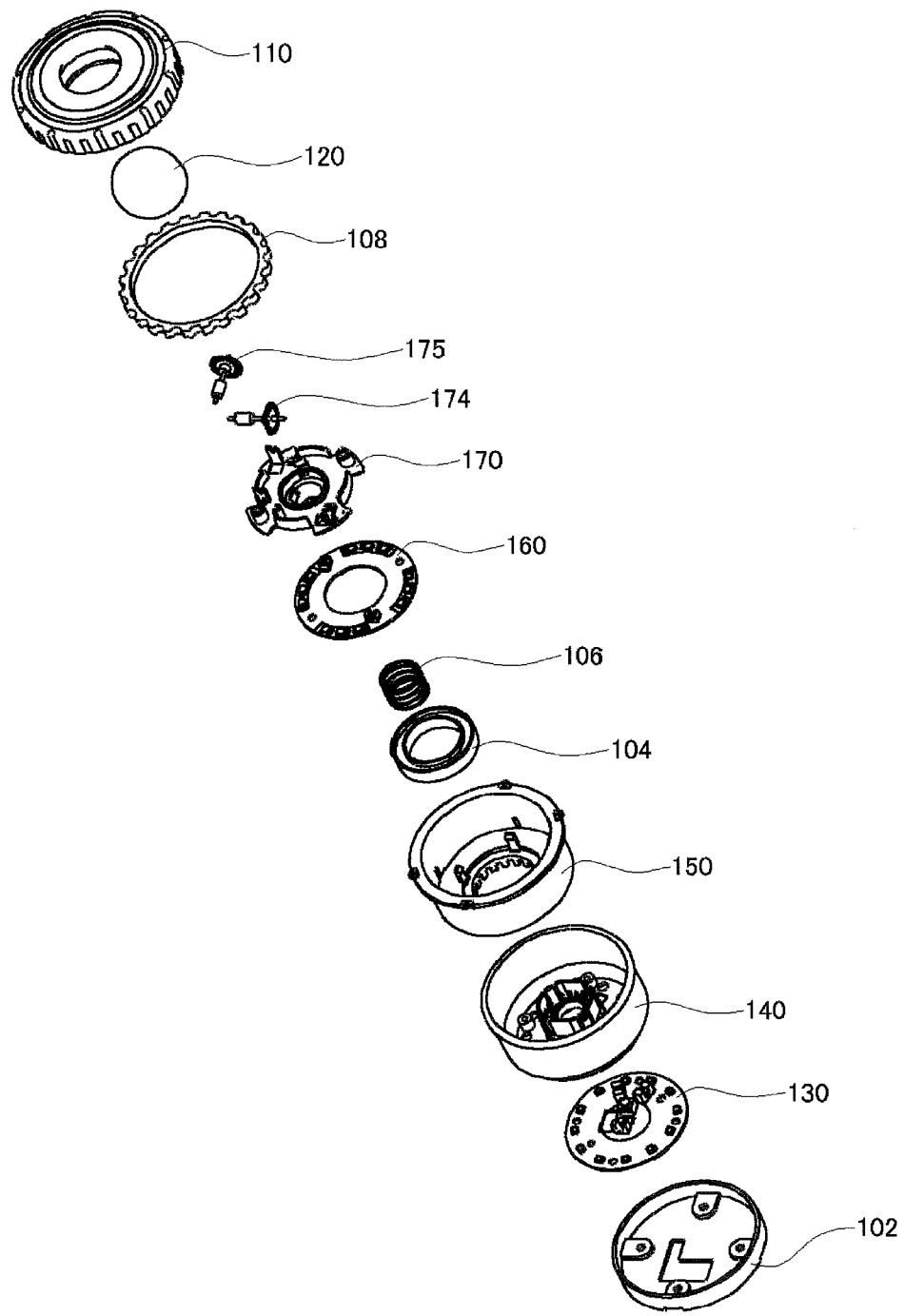
FIG. 3 is an exploded perspective view of an operation unit.

FIG. 3 illustrates an exploded perspective view of the operation unit 100. The operation unit 100 comprises a lower part cover 102, a base plate 130, an outer cylinder 140, an inner cylinder 150, a bearing 104, a spring 106, a base plate 160, a ball support 170, an encoder 174 and 175, a weight 108, a ball 120, and a rotary body 110.

Figure 4:
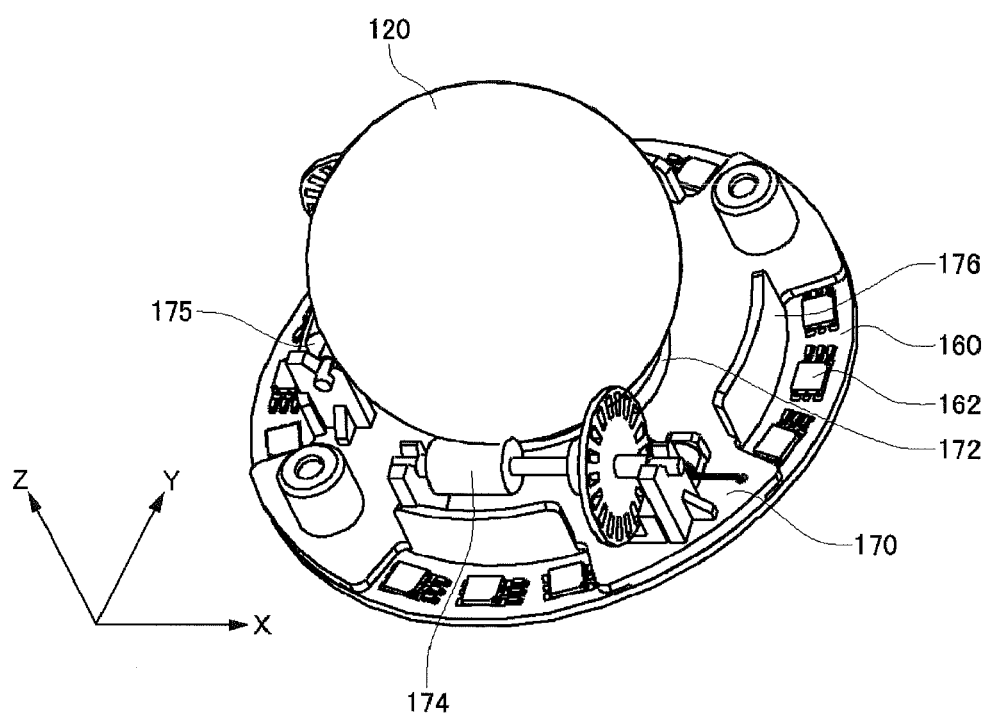
FIG. 4 is an external perspective view of some of components of an operation unit.

FIG. 4 illustrates an external perspective view of some of components of the operation unit 100. The base plate 160 is placed below the ball support 170. The base plate 160 is fixed to the rear surface of the ball support 170. The ball support 170 and the base plate 160 each have a round through-hole at their central portions. The ball support 170 has the encoder 174 that detects rotation of the ball 120 in a first direction or the direction opposite to the first direction (the Y-axis positive direction or negative direction) and the encoder 175 that detects rotation of the ball 120 in a second direction or the direction opposite to the second direction (the X-axis positive direction or negative direction). The ball 120 is supported by the encoders 174 and 175. The encoders 174 and 175 are one example of a first ball-detecting part that detects rotation of a ball. The encoders 174 and 175 detect the amount of rotation, rotation speed, and direction of rotation of the ball 120.

The base plate 160 is disk-shaped, and has a plurality of LEDs 162 placed along its edge part. LEDs among the plurality of LEDs 162 are each placed at a position that is opposite to each other in the first direction, and a position that is opposite to each other in the second direction. The plurality of LEDs 162 is one example of a first ball-light-emitting part that emits light responding to rotation of the ball being detected by the first ball-detecting part. The plurality of LEDs 162 is provided below a peripheral area of the through-hole of the rotary body 110, and outputs light from the periphery of the rotary body 110.

The operation unit 100 further comprises a first ball-light-emission control part that controls a light-emission pattern of the plurality of LEDs 162 based on the amount of rotation, rotation speed, or direction of rotation of the ball 120. The first ball-light-emission control part may be, for example, configured with a microcomputer. The microcomputer may be provided to the base plate 130. Alternatively, the microcomputer may be provided outside the operation unit 100.

The plurality of LEDs 162 may emit light according to the direction of rotation. For example, when the ball 120 rotates in the first direction (the Y-axis positive direction), only an LED, among the plurality of LEDs 162, that is placed in the first direction (the Y-axis positive direction) may emit light. Also, the plurality of LEDs 162 may emit light of different colors according to the amount of rotation or rotation speed of the ball 120. The plurality of LEDs 162 may emit light of different colors according to the amount of rotation while the ball 120 is rotating continuously.

The ball support 170 has a plurality of reflection walls 176 that are formed along the array direction of the plurality of LEDs 162. Light that is output from the plurality of LEDs 162 is reflected by the plurality of reflection wall 176, and output upward.

The ball support 170 further includes a hollow cylindrical part 172 that extends upward from an outer peripheral portion of its through-hole. The cylindrical part 172 supports the ball 120 with an open end of the cylindrical part 172. Along with the rotation of, the ball 120, foreign matter such as dust may adhere thereto. The foreign matter that has adhered to the ball 120 along with rotation of the ball 120 may be taken into the operation unit 100. To cope with this, the foreign matter that has adhered to the ball 120 is removed at the open end of the cylindrical part 172. Thereby, it is possible to prevent the foreign matter that has adhered to the ball 120 from falling downward via the through-holes formed in the ball support 170 and the base plate 160.

Figure 5:
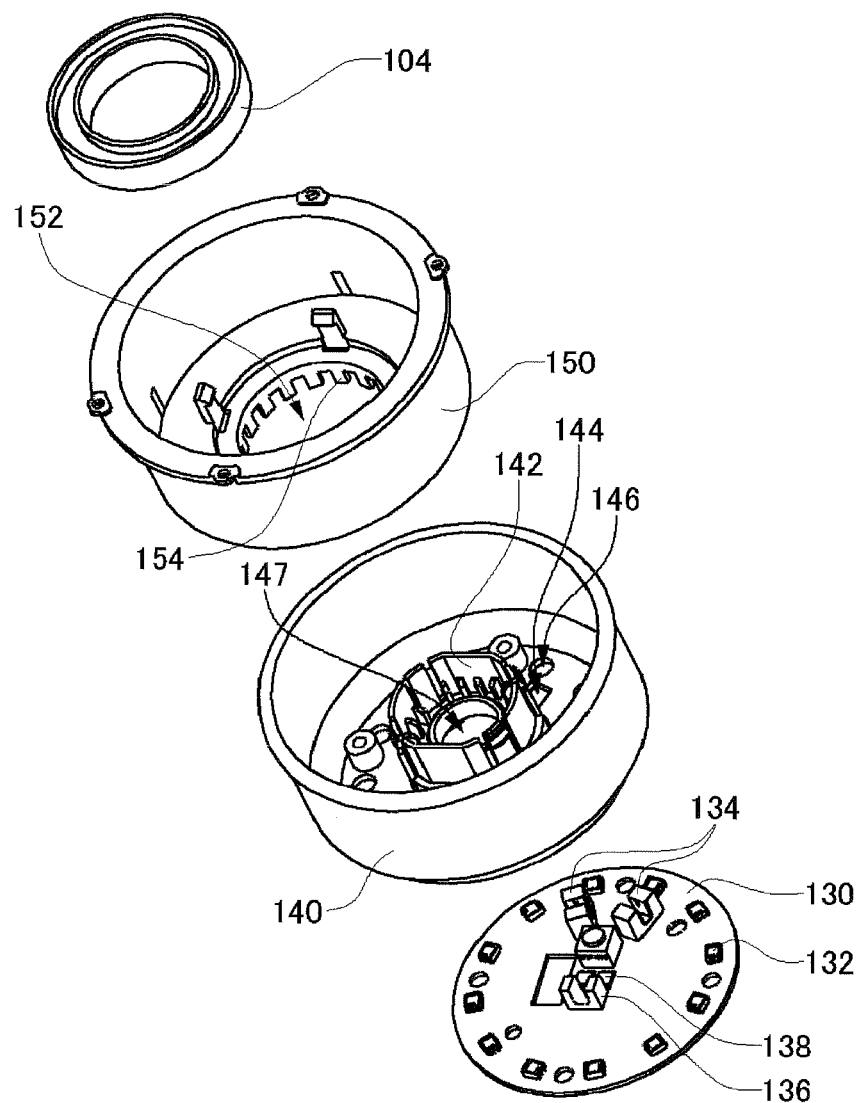
FIG. 5 is an external perspective view of a base plate, an outer cylinder, an inner cylinder, and a bearing.

FIG. 5 illustrates an external perspective view of the base plate 130, the outer cylinder 140, the inner cylinder 150, and the bearing 104. The base plate 130 is disk-shaped, and has, along its edge part, a plurality of LEDs 132. The base plate 130 has, inside the plurality of LEDs 132, two transmission-type photo-interrupters 134 that detect rotation of the rotary body 110. The transmission-type photo-interrupters 134 are one example of a rotary body-detecting part. The transmission-type photo-interrupters 134 detect the amount of rotation, rotation speed, and direction of rotation of the rotary body. The base plate 130 further has, at its central portion, a transmission-type photo-interrupter 136 that detects pressing of the ball 120. The transmission-type photo-interrupter 136 is one example of a second ball-detecting part. The base plate 130 further has, at its central portion, a plurality of LEDs 138.

The plurality of LEDs 132 emits light responding to rotation of the rotary body 110 being detected by the transmission-type photo-interrupters 134. The plurality of LEDs 132 is one example of a rotary body-light-emitting part and a rotary body-light-emitting element. The plurality of LEDs 132 is provided below a peripheral area of the through-hole of the rotary body 110, and outputs light from a periphery of the rotary body 110.

The operation unit 100 further comprises a rotary body-light-emission control part that controls a light-emission pattern of the plurality of LEDs 132 based on the amount of rotation, rotation speed, or direction of rotation of the rotary body 110 detected by the transmission-type photo-interrupters 134. The rotary body-light-emission control part may be, for example, configured with a microcomputer. The microcomputer may be provided to the base plate 130. The microcomputer may be provided outside the operation unit 100. Also, one microcomputer may be allowed to function as a ball-light-emission control part and a rotary body-light-emission control part.

The plurality of LEDs 132 may emit light of different colors according to the amount of rotation or rotation speed of the rotary body 110. The plurality of LEDs 132 may emit light of different colors according to the amount of rotation while the rotary body 110 is rotating continuously.

The plurality of LEDs 138 emits light responding to pressing of the ball 120 being sensed by the transmission-type photo-interrupter 136. The plurality of LEDs 138 is one example of a second ball-light-emitting part and a second ball-light-emitting element. The plurality of LEDs 138 is positioned below the ball 120, and outputs light through the ball 120.

The outer cylinder 140 is hollow and cylindrical. The outer cylinder 140 has, at a central portion of its inside, a hollow and cylindrical axial part 142. The outer cylinder 140 has a plurality of through-holes 146 at positions, at its bottom part, that face the plurality of LEDs 132. Light from the plurality of LEDs 132 is output upward via the plurality of through-holes 146. The outer cylinder 140 further has a through-hole 144 at a position, at its bottom part, that faces the transmission-type photo-interrupters 134. A light-emitting part and a light receiving part of the transmission-type photo-interrupter 134 protrude toward the inside of the outer cylinder 140 via the through-hole 144. Also, the outer cylinder 140 further has, at its central portion, a through-hole 147. A light-emitting part and a light receiving part of the transmission-type photo-interrupter 136 protrude toward the inside of the outer cylinder 140 via the through-hole 147. Light from the plurality of LEDs 138 is output upward via the through-hole 147.

The inner cylinder 150 is hollow and cylindrical. The inner cylinder 150 has a round through-hole 152, and is provided inside the outer cylinder 140 such that the inner cylinder 150 is rotatable about a central axis of the axial part 142 via the bearing 104. The inner cylinder 150 has a plurality of pieces to be detected 154 that protrude from an outer surface of the bottom part. The plurality of pieces to be detected 154 are placed at constant intervals along an outer periphery of the through-hole 152. The two transmission-type photo-interrupters 134 detect the pieces to be detected 154, and detect the rotation speed, amount of rotation, and direction of rotation of the inner cylinder 150 based on the timing and intervals at which the respective transmission-type photo-interrupters 134 detect the pieces to be detected 154.

Figure 6:
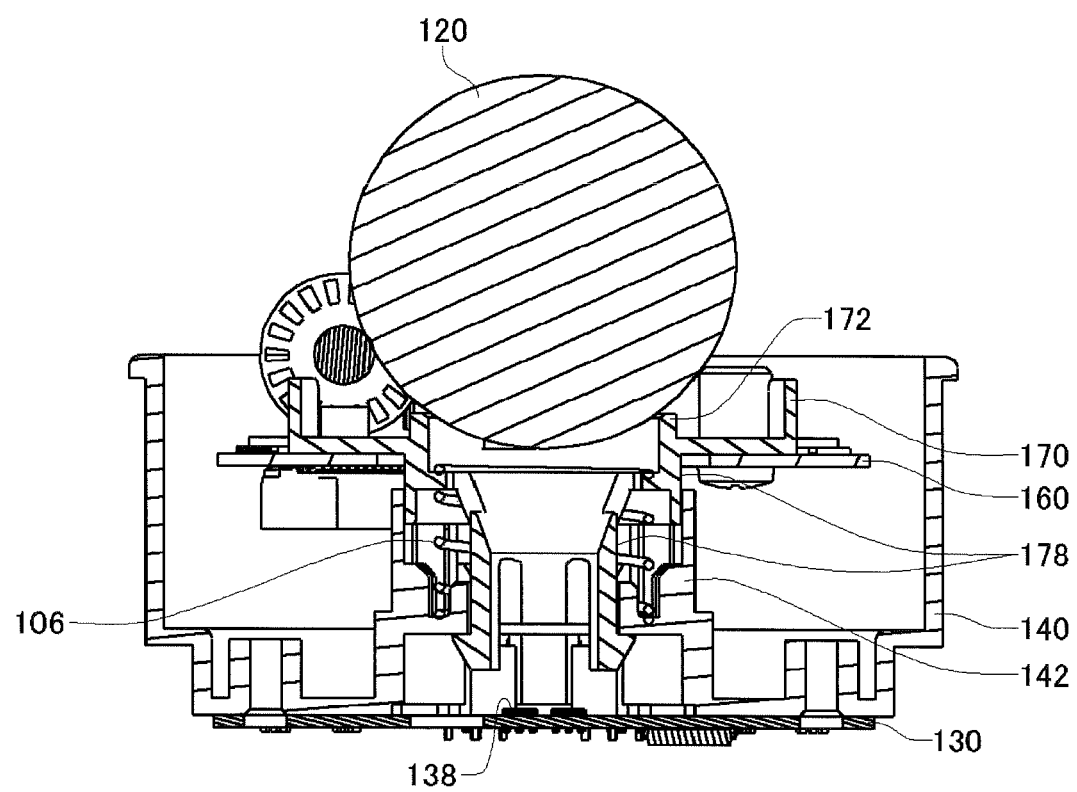
FIG. 6 is a sectional view of some of components of an operation unit taken along the X-axis illustrated in FIG. 2.

FIG. 6 is a sectional view of some of components of the operation unit 100 taken along the X-axis illustrated in FIG. 2. The ball support 170 has a hollow axial part 178 that protrudes from the rear surface of the ball support 170. The axial part 178 is supported such that it is movable upward and downward (in the Z-axis direction) inside the axial part 142 of the outer cylinder 140. The spring 106 is placed inside the axial part 142 of the outer cylinder 140, and the ball support 170 is supported by the spring 106. Due to the elastic force of the spring 106, when the ball 120 is no longer pressed, the ball support 170, that has been pressed in as a result of the ball 120 being pressed can return to a position where the ball support 170 was before being pressed in.

The plurality of LEDs 138 provided to the base plate 130 irradiates the ball 120 with light via the inside of the axial part 178 responding to pressing of the ball 120. Then, the radiated light is transmitted through the ball 120, and output to the outside. Also, the ball 120 is supported at an open end of the cylindrical part 172 provided to the ball support 170. Because foreign matter that has adhered to the ball 120 is removed by the cylindrical part 172, it is possible to prevent the foreign matter from falling onto the base plate 130 from the inside of the axial part 178. Thereby, adhesion of the foreign matter to the plurality of LEDs 138 or the transmission-type photo-interrupter 136 that are provided onto the base plate 130 can be prevented. Accordingly, it becomes possible to prevent foreign matter from obstructing radiation of light from the plurality of LEDs 138, and from obstructing detection of pressing of the ball 120 by the transmission-type photo-interrupter 136.

Figure 7:
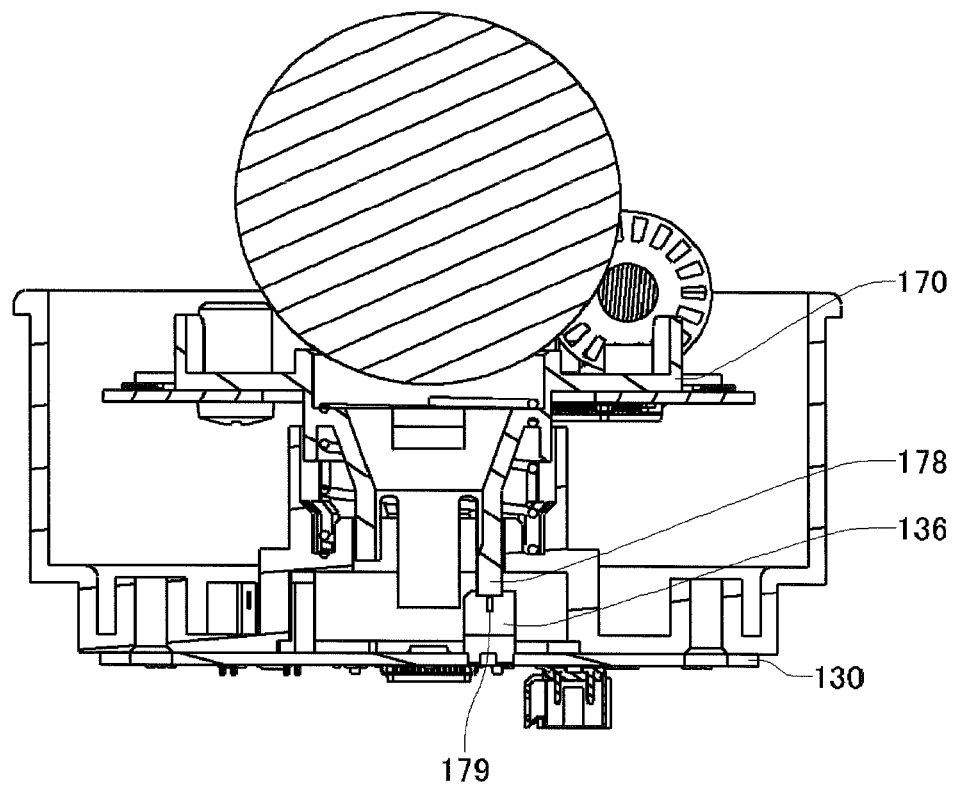
FIG. 7 is a sectional view of some of components of an operation unit taken along the Y-axis illustrated in FIG. 2.

FIG. 7 illustrates a sectional view of some of components of the operation unit 100 taken along the Y-axis illustrated in FIG. 2. An edge portion of the axial part 178 that protrudes from the rear surface of the ball support 170 is provided with a flag 179 that is matter to be detected by the transmission-type photo-interrupter 136 provided onto the base plate 130. When the ball support 170 moves downward as a result of the ball 120 being pressed, the flag 179 is detected by the transmission-type photo-interrupter 136, and the pressing of the ball 120 is sensed. Note that a sensor to sense pressing of the ball 120 is not limited to the transmission-type photo-interrupter 136. For example, a sensor such as a piezoelectric sensor that senses pressing of the ball 120 may be provided inside the ball 120 that is configured with an elastic material, and pressing of the ball 120 may be sensed by sensing, with the sensor, that the ball 120 is deformed as a result of the ball 120 being pressed.

Figure 8:
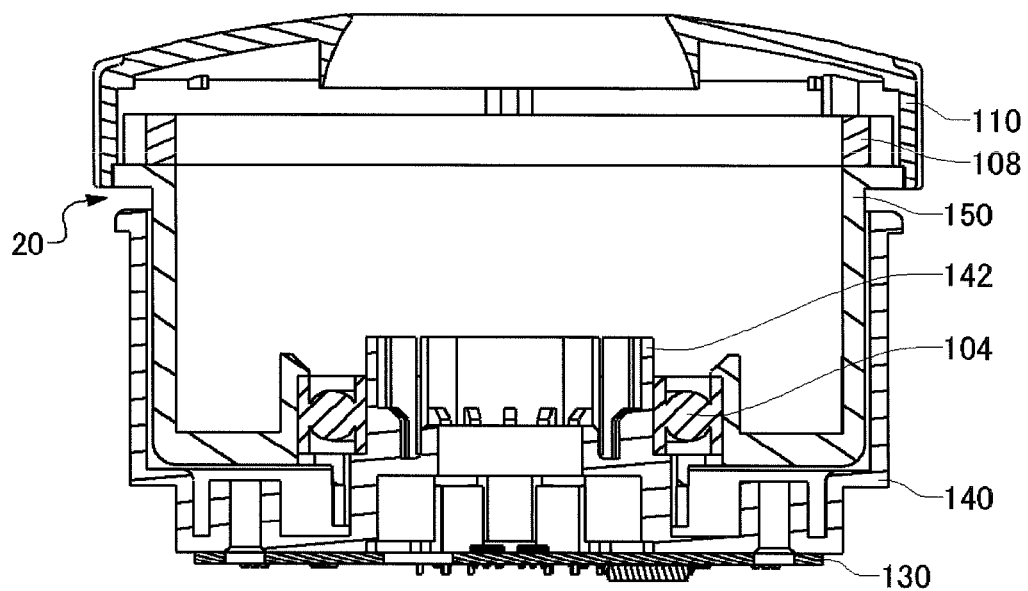
FIG. 8 is a sectional view of some of components of an operation unit taken along the X-axis illustrated in FIG. 2.

FIG. 8 illustrates a sectional view of some of components of the operation unit 100 taken along the X-axis illustrated in FIG. 2. The inner cylinder 150 is supported by the axial part 142 of the outer cylinder 140 such that the inner cylinder 150 is rotatable via the bearing 104

The rotary body 110 is fixed at an open end of the inner cylinder 150. The rotary body 110 rotates about a central axis of the axial part 142 together with the inner cylinder 150. The plurality of LEDs 132 provided to an edge part of the base plate 130 emits light according to rotation of the rotary body 110. The light output from the plurality of LEDs 132 is output externally via a gap 20 between the outer cylinder 140 and the inner cylinder 150. The weight 108 is fixed inside the rotary body 110, and the rotation speed and rotation duration of the rotary body 110 are controlled by the weight of the weight 108.

As described above, the operation unit 100 according to one or more embodiments of the present invention enables reduction of the installation space of an operation button and the like by placing the ball 120 that functions as a trackball and a push-button switch inside the rotary body 110 that receives an instruction to rotate a reel, and the like. When the space for adding an operation button and the like is small, for example, the display part 14 that is a main screen of a slot machine may be configured with a touch panel display, and the display part 14 may be allowed to function as an operation unit having another function. However, some players may not be able to reach for the display part 14 that is a main screen of a slot machine, or may feel it is bothersome to perform touch operation by using a touch panel display. Because the operation unit 100 according to one or more embodiments of the present invention allows installation within a relatively small space, it is easy to install the operation unit 100 on an operation board that is originally provided to the main body 12 of the slot machine 10. Therefore, it is possible to easily install the operation unit 100 in which a plurality of operation functions are integrated, at a location that allows easy operation even for a player who does not prefer the above-mentioned touch panel display.

While embodiments of the present invention are described above, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An operation unit comprising:
   a rotary body that comprises a through-hole, and that rotates about a rotation axis that passes through the through-hole;
   a ball disposed inside the through-hole;
   a rotary body-detecting part that detects rotation of the rotary body;
   a first ball-detecting part that detects rotation of the ball; and
   a second ball-detecting part that detects pressing of the ball.

2. The operation unit according to claim 1, further comprising:
   a rotary body-light-emitting part that emits light responding to rotation of the rotary body detected by the rotary body-detecting part.

3. The operation unit according to claim 2,
   wherein the rotary body-detecting part detects at least one of the amount of rotation, rotation speed, and direction of rotation of the rotary body, and
   wherein the operation unit further comprises:
     a rotary body-light-emission control part that controls a light-emission pattern of the rotary body-light-emitting part based on the amount of rotation, rotation speed, or direction of rotation of the rotary body detected by the rotary body-detecting part.

4. The operation unit according to claim 2,
   wherein the rotary body-light-emitting part has at least one rotary body-light-emitting element, and
   wherein the at least one rotary body-light-emitting element is disposed below a peripheral area of the through-hole of the rotary body, and outputs light from a periphery of the rotary body.

5. The operation unit according to claim 1, further comprising:
   a first ball-light-emitting part that emits light responding to rotation of the ball detected by the first ball-detecting part.

6. The operation unit according to claim 5,
   wherein the first ball-detecting part detects at least one of the amount of rotation, rotation speed, and direction of rotation of the ball, and
   wherein the operation unit further comprises:
     a first ball-light-emission control part that controls a light-emission pattern of the first ball-light-emitting part based on the amount of rotation, rotation speed, or direction of rotation of the ball detected by the first ball-detecting part.

7. The operation unit according to claim 5,
   wherein the first ball-light-emitting part comprises at least one first ball-light-emitting element, and
   wherein the at least one first ball-light-emitting element is disposed below a peripheral area of the through-hole of the rotary body, and outputs light through the rotary body.

8. The operation unit according to claim 6,
wherein the first ball-light-emitting part comprises a plurality of first ball-light-emitting elements,
wherein the plurality of first ball-light-emitting elements are disposed below different positions of a peripheral area of the through-hole of the rotary body, and output light from the rotary body, and
wherein the first ball-light-emission control part allows a first ball-light-emitting element, among the plurality of first ball-light-emitting elements, that is associated with the direction of rotation of the ball detected by the first ball-detecting part to emit light.

9. The operation unit according to claim 1, further comprising:
a second ball-light-emitting part that emits light responding to pressing of the ball detected by the second ball-detecting part.

10. The operation unit according to claim 9,
wherein the second ball-light-emitting part comprises at least one second ball-light-emitting element,
wherein the ball transmits light, and
wherein the at least one second ball-light-emitting element is disposed below the ball, and outputs light through the ball.

11. The operation unit according to claim 1, further comprising:
an outer cylinder that is hollow and cylindrical, and comprises an axial part therein;
an inner cylinder that is hollow and cylindrical, and is disposed inside the outer cylinder such that the inner cylinder is rotatable about a central axis of the axial part; and
a ball support that is disposed inside the inner cylinder such that the ball support is movable up and down along the central axis direction, and that supports the ball.

12. The operation unit according to claim 11, wherein the ball support comprises a hollow cylindrical part, and supports the ball at an open end of the cylindrical part.

13. The operation unit according to claim 3,
wherein the rotary body-light-emitting part has at least one rotary body-light-emitting element, and
wherein the at least one rotary body-light-emitting element is disposed below a peripheral area of the through-hole of the rotary body, and outputs light from a periphery of the rotary body.

14. The operation unit according to claim 13, further comprising:
a first ball-light-emitting part that emits light responding to rotation of the ball detected by the first ball-detecting part.

15. The operation unit according to claim 14,
wherein the first ball-detecting part detects at least one of the amount of rotation, rotation speed, and direction of rotation of the ball, and
wherein the operation unit further comprises:
a first ball-light-emission control part that controls a light-emission pattern of the first ball-light-emitting part based on the amount of rotation, rotation speed, or direction of rotation of the ball detected by the first ball-detecting part.

16. The operation unit according to claim 15,
wherein the first ball-light-emitting part comprises at least one first ball-light-emitting element, and
wherein the at least one first ball-light-emitting element is disposed below a peripheral area of the through-hole of the rotary body, and outputs light through the rotary body.

17. The operation unit according to claim 1, wherein the ball is exposed for user operation from a top surface of the rotary body.

18. The operation unit according to claim 1, wherein the ball functions as a trackball and a push-button switch.

19. The operation unit according to claim 1, wherein the first ball-detecting part detects rotation of the ball about two axes.

20. The operation unit according to claim 1, wherein the center of the ball is substantially along the rotation axis.

* * * * *